US007770826B2

(12) United States Patent
Ballu et al.

(10) Patent No.: US 7,770,826 B2
(45) Date of Patent: Aug. 10, 2010

(54) ROTARY SPRAYER FOR SPRAY COATING MATERIAL, AN INSTALLATION INCLUDING SUCH A SPRAYER, AND A METHOD OF VERIFYING THE OPERATION OF SUCH A SPRAYER

(75) Inventors: Patrick Ballu, Reims (FR); Caryl Thome, Saint Egreve (FR)

(73) Assignee: Sames Technologies, Meylan (FR)

( * ) Notice: Subject to any disclaimer, the term of this patent is extended or adjusted under 35 U.S.C. 154(b) by 0 days.

(21) Appl. No.: 11/573,864

(22) PCT Filed: Aug. 24, 2005

(86) PCT No.: PCT/FR2005/002132

§ 371 (c)(1),
(2), (4) Date: Sep. 13, 2007

(87) PCT Pub. No.: WO2006/024798

PCT Pub. Date: Mar. 9, 2006

(65) Prior Publication Data

US 2008/0164342 A1 Jul. 10, 2008

(30) Foreign Application Priority Data

Aug. 25, 2004 (FR) .................................. 04 09090

(51) Int. Cl.

*B67D 7/08* (2010.01)
*B67D 7/56* (2010.01)
*B05B 3/10* (2006.01)
*B44D 5/10* (2006.01)
*F23D 11/04* (2006.01)
*F16C 32/06* (2006.01)

(52) U.S. Cl. .......................... 239/703; 239/73; 239/74; 239/223; 239/224; 239/700; 384/107

(58) Field of Classification Search .................. 239/73, 239/74, 223, 224, 703; 384/107
See application file for complete search history.

(56) References Cited

U.S. PATENT DOCUMENTS 3,938,863 A * 2/1976 Victor et al. ................ 384/107

(Continued)

FOREIGN PATENT DOCUMENTS

EP 58084071 5/1983

(Continued)

*Primary Examiner*—Dinh Q Nguyen
*Assistant Examiner*—Ryan Reis
(74) *Attorney, Agent, or Firm*—Robert M. Gould; Duane Morris LLP

(57) ABSTRACT

The invention concerns a rotary nozzle combination (P) for coating product comprising an atomizing bowl (3) and a rotor (11) adapted to rotate the bowl about a geometrical axis (X-X'), and means (4, 5, 6, 7) for controlling the presence and/or proper mounting of the bowl (3) on the rotor (11). The rotor (11) is spaced apart from a non-rotating part ($P_1$) and the control means comprise first means (4, 5) enabling a force ($F_3$) to be applied on the bowl (3) tending to vary the thickness of an air-film of the pneumatic thrust bearing ($P_1$), as well as second means (7, 8) for determining the air pressure in the bearing ($P_1$). The pressure of air in the thrust bearing ($P_1$) can be determined when the latter is normally supplied and compared with at least one reference value.

10 Claims, 3 Drawing Sheets

U.S. PATENT DOCUMENTS

| | | | | | |
|---|---|---|---|---|---|
| 4,361,288 | A | * | 11/1982 | Fukuda et al. | 239/703 |
| 4,378,091 | A | * | 3/1983 | Morishita et al. | 239/703 |
| 4,467,968 | A | * | 8/1984 | Morishita et al. | 239/703 |
| 4,650,123 | A | * | 3/1987 | Ooishi | 239/703 |
| 4,811,906 | A | * | 3/1989 | Prus | 239/703 |
| 5,584,435 | A | * | 12/1996 | Lind | 239/73 |
| 5,685,495 | A | | 11/1997 | Pham et al. | |
| 6,581,857 | B2 | * | 6/2003 | Fujii et al. | 239/703 |
| 6,592,054 | B2 | | 7/2003 | Prus | |

FOREIGN PATENT DOCUMENTS

| | | |
|---|---|---|
| EP | 0567436 | 10/1993 |
| WO | 9412286 | 6/1994 |
| WO | 0162396 | 8/2001 |

* cited by examiner

ROTARY SPRAYER FOR SPRAY COATING MATERIAL, AN INSTALLATION INCLUDING SUCH A SPRAYER, AND A METHOD OF VERIFYING THE OPERATION OF SUCH A SPRAYER

BACKGROUND

The invention relates to a rotary sprayer for spraying coating material, to a coating installation including such a sprayer, and also to a method of verifying the operating state of such a sprayer.

In an installation for spraying coating material, it is known to atomize the material by means of a rotary element, referred to as a bowl or cup, that is fed with the material and that rotates at a speed usually lying in the range 2000 revolutions per minute (rpm) to 120,000 rpm. At the speeds under consideration, the bowl must be as light as possible and balanced so as to avoid unbalance as much as possible, particularly if its rotary drive means include a turbine with an air bearing.

It is known, for example from WO-A-94/12286, to connect a bowl to a rotor by means of an engagement ring capable of expanding radially. It is also known, e.g. from WO-A-01/62396, to use magnetic coupling means between the bowl and the rotor of a turbine.

In a rotary sprayer provided with an air bearing, and as provided in EP-A-0 567 436, it is possible to use a microphone to obtain an indication concerning the speed of rotation of the rotary portion. Such a microphone delivers a signal even if the rotary portion is not fitted with a bowl or if the bowl is poorly mounted.

With known equipment, there exists a risk of starting the sprayer while it is not fitted with the bowl or while the mounting of the bowl relative to its drive rotor has not been performed correctly. Starting a sprayer without the bowl can lead to certain portions of the sprayer becoming polluted and also to coating material being deposited in unsuitable manner on one or more articles to be coated, which can require them to be rejected. With an electrostatic sprayer, putting voltage unit without the coating material being atomized by the bowl can lead to an electric arc being formed between a continuous jet of non-atomized coating material and an article at ground potential, and that can be dangerous. When a bowl is poorly mounted on its drive member, it is liable to become detached therefrom suddenly, because of the accelerations to which it is subjected, being ejected therefrom violently, which can be dangerous for personnel present on site, and which can result in articles to be coated or certain portions of the installation being damaged.

The invention seeks particularly to remedy those drawbacks by proposing a rotary sprayer of operation that is made more reliable than sprayers in the state of the art.

SUMMARY

In this context, the invention relates to a rotary sprayer for spraying coating material, the sprayer comprising an atomizer bowl and a member suitable for driving said bowl in rotation about an axis, said member being held at a distance from a non-rotary portion of the sprayer by means of at least one air thrust bearing. The sprayer is characterized in that it further comprises means for monitoring the presence and/or proper mounting of said bowl on said drive member, said means comprising:

first means enabling a force to be exerted on said bowl, tending to vary the thickness of the air film of said air thrust bearing; and second means for determining the air pressure in said thrust bearing, said second means being connected to means for comparing the determined value of the air pressure with at least one reference value.

By means of the invention, safe operation of the sprayer can be obtained independently of any lack of attention of the part of the operator. Determining the air pressure in the thrust bearing serves indirectly to detect the magnitude of the force exerted by the first means. In the absence of a bowl, the force in question is practically zero, and that can be detected by the second means. When the bowl is mounted incorrectly, the magnitude of the above-mentioned force can have a value that is not in compliance, and that likewise can be detected by the second means.

According to aspects that are advantageous but not essential, a rotary sprayer may incorporate one or more of the following technical characteristics taken in any technically feasible combination:

The first means are magnetic coupling means between the bowl and a non-rotary portion of the sprayer, the force exerted by the first means being a magnetic force, that is parallel at least in part to the axis of rotation of the bowl. Advantageously, this force is suitable for inducing rotary coupling between the bowl and the member, in particular by adhesion. The value of the width of an airgap defined by the magnetic coupling means is advantageously greater than the value of the thickness of the film of air in the thrust bearing.

The second means comprise at least one pressure takeoff formed in the bearing, together with apparatus for measuring pressure connected to said pressure takeoff. Under such circumstances, at least one of the surfaces between which the thrust bearing is defined can be provided with a hollow portion in relief arranged around or facing the outlet for the pressure takeoff in the thrust bearing.

The invention also relates to an installation for spraying coating material, the installation including at least one sprayer as mentioned above. The safety of such an installation is improved compared with the state of the art and its operation is more reliable.

The invention also relates to a method of verifying the operating state of a rotary sprayer as described above, and more specifically a method comprising the steps consisting in:

determining the air pressure in a thrust bearing formed between a rotary drive member and a non-rotary portion of the sprayer while the bearing is being fed normally; and monitoring the presence and/or proper mounting of the bowl by comparing the determined value of said pressure with at least one reference value.

By means of the method of the invention, the absence of any bowl or faulty positioning of a bowl can be detected as a result of the comparison step.

The above steps can be implemented each time the sprayer is started, periodically or continuously while the sprayer is in operation, or when the bowl is stationary, with the thrust bearing being fed with air under pressure.

The invention can be better understood and other advantages thereof appear more clearly in the light of the following description of an embodiment of a sprayer and a method in accordance with its principle, given purely by way of example and made with reference to the accompanying drawings.

DETAILED DESCRIPTION

Figure 1:
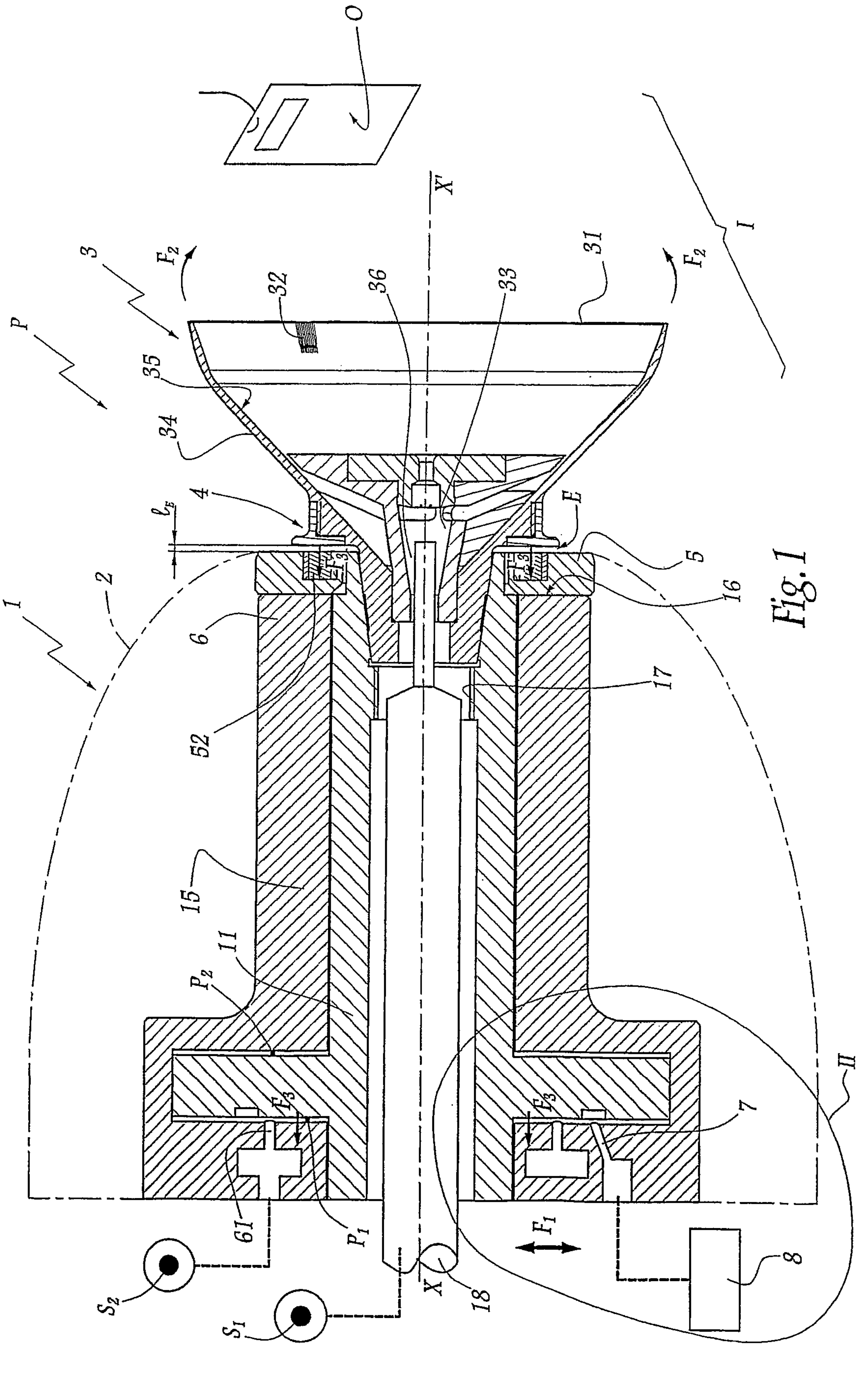
FIG. 1 is a theoretical longitudinal section of a coating material sprayer in accordance with the invention as used in an installation in accordance with the invention.
Figure 2:
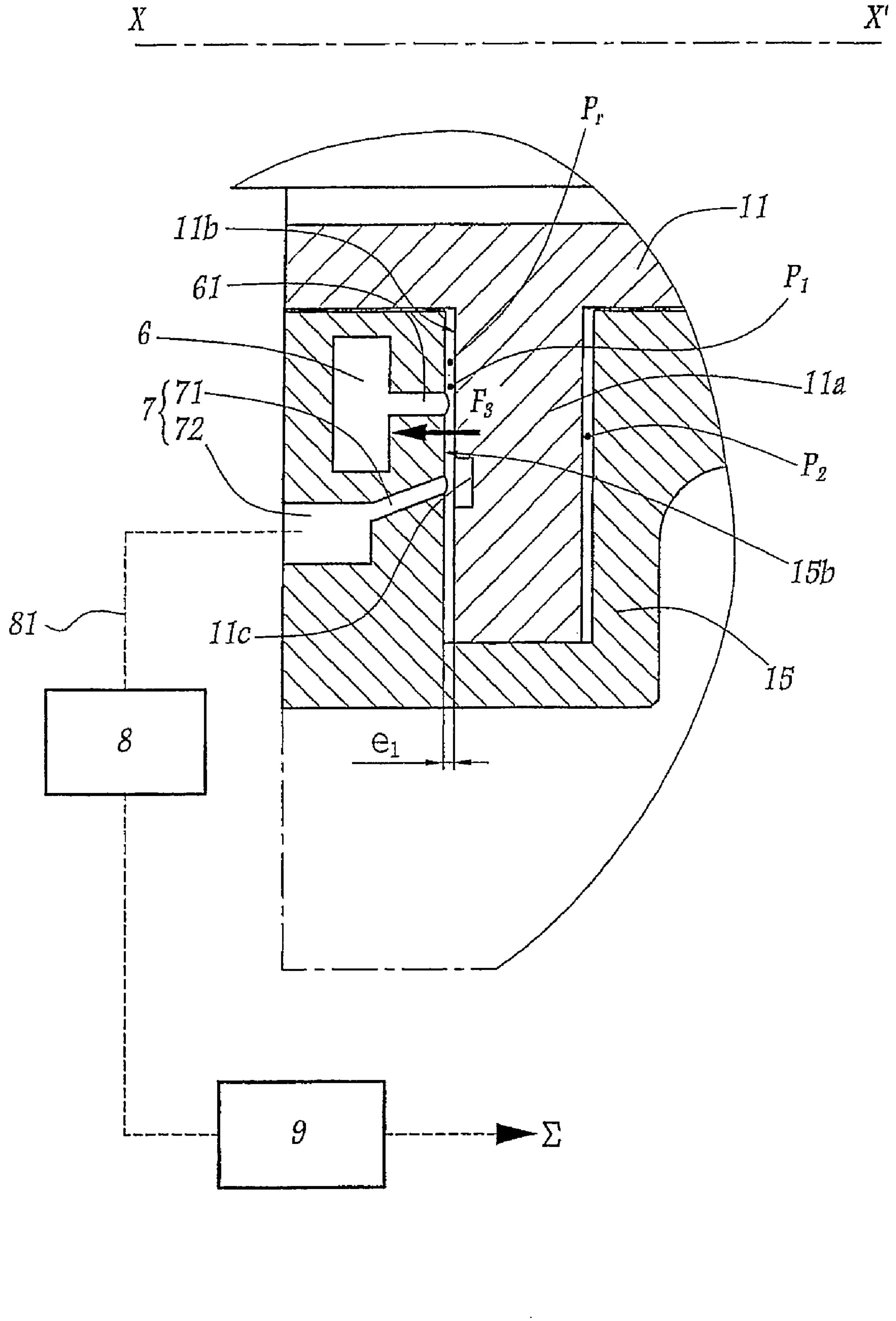
FIG. 2 is a view on a larger scale showing a detail II of FIG. 1, and diagrammatically showing a comparator associated with the sprayer.
Figure 3:
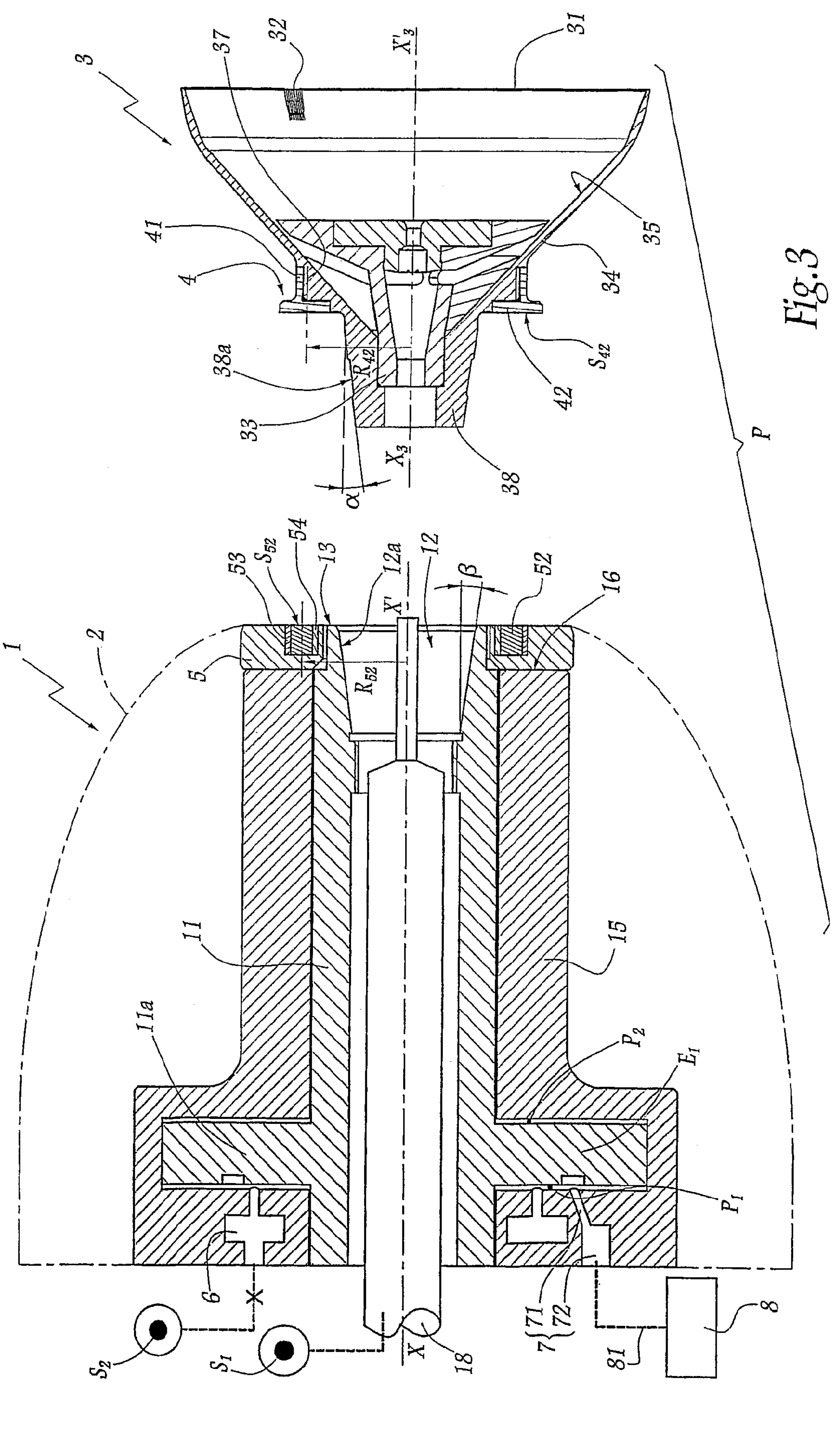
FIG. 3 is a section similar to FIG. 1, with the bowl being offset axially from the body of the sprayer.

The sprayer P shown in FIGS. 1 to 3 is for being fed with coating material from one or more sources $S_1$ and it is moved, for example, with a motion that is essentially vertical, represented by double-headed arrow $F_1$, past articles 0 for coating within an article-coating installation I. The sprayer P includes an air turbine 1 surrounded by a protective cover 2 and supporting a bowl 3 that is to be set into rotation about an axis X-X' by the rotor 11 of the turbine.

The rotor enables the bowl 3 to be driven at a speed of several tens of thousands of revolutions per minute, such that the coating material coming from the source $S_1$ via an injection tube 18 is atomized as it heads towards an article 0, as represented by arrows $F_2$.

According to an advantageous aspect of the invention (not shown), the sprayer P may be of the electrostatic type, i.e. associated with means for electrostatically charging the coating material before or after it is expelled from the rim 31 of the bowl 3.

As shown in part in the figures, the bowl 3 may be provided with notches 32. The bowl 3 is symmetrical $X_3$-$X'_3$ coinciding with the axis X-X' when the bowl 3 is mounted on the rotor 11. The bowl 3 has a hollow hub 33 together with a body 34 defining a surface 35 over which the material flows and spreads from the hub 33 going towards the rim 31.

A ring 4 of ferromagnetic material, e.g. of magnetic stainless steel, is mounted around the body 34. This ring includes a portion 42 that defines an annular surface $S_{42}$ that is generally perpendicular to the axis $X_3$-$X'_3$.

The body 34 forms a male portion 38 that is to penetrate in a central housing 12 in the end of the rotor 11. The outside surface 38*a* of the portion 38 is generally frustoconical, converging towards the rear of the bowl 3, i.e. away from the rim 31. The surface 12*a* of the housing 12 is also frustoconical, diverging towards the front face 13 of the rotor 11. The half-angle at the apex of the portion 38 is written $\alpha$ and the half-angle at the apex of the housing 12 is written $\beta$. The angles $\alpha$ and $\beta$ are substantially equal, thereby enabling the surface 38*a* and 12*a* to bear against each other surface against surface. Such surface-on-surface bearing enables the elements 11 and 3 to be secured to each other in rotation by adhesion.

A body 15 of the turbine 1 surrounds the rotor 11 and in practice constitutes the stator of the turbine. The body is not movable in rotation, even if it can be moved relative to the articles 0, as represented by the double-headed arrow $F_1$. A support 5 of magnetic material, e.g. of magnetic stainless steel, is mounted on the front face 16 of the body 15, this support being provided with an annular groove centered on the axis X-X', and in which there is placed a magnet 52 that is likewise annular. The magnet 52 is held in place in the groove by two layers of adhesive 53 and 54 which extend radially on either side of the magnet.

Instead of a single magnet 52, it is possible to place a plurality of magnets in the above-mentioned groove, the magnets together forming a ring. The magnet(s) may be made of ferromagnetic material or of a synthetic resin filled with injected particles of ferromagnetic metal, so that the particles are oriented in a common overall direction.

Instead of layers 53 and 54 of adhesive, washers of non-magnetic metal or having low magnetic permeability could be used. Similarly, volumes filled with air could be envisaged.

When the bowl 3 is properly mounted on the rotor 11, i.e. when the surfaces 12*a* and 38*a* are bearing surface against surface, an airgap E is provided between the exposed surface $S_{52}$ of the magnet 52 and the surface $S_{42}$.

The mean radius of the element 52 is written $R_{52}$. The mean radius of the surface $S_{42}$ is written $R_{42}$ The radii $R_{42}$ and $R_{52}$ are substantially equal, which corresponds to the fact that when the bowl 3 is mounted on the rotor 11, the surface $S_{42}$ is placed facing the surface $S_{52}$ and is centered relative thereto. The magnetic field due to the magnetic 52 is thus closed through the portion 42 of the ring 4. This magnetic field serves to exert a magnetic coupling force $F_3$ on the ring 4 substantially parallel to the axis X-X', i.e. axially, and tending to press the bowl 3 firmly against the rotor 11, i.e. to press the surface 38*a* against the surface 12*a*. Given this force, the contacting surfaces 38*a* and 12*a* are constrained to rotate together by adhesion, thus enabling the bowl 3 to be driven by the rotor 11.

The force $F_3$ is transmitted by the portion 38 of the bowl 3 to the rotor 11, which tends to move the rotor 11 rearwards relative to the body 15.

The rotor 11 is held in position relative to the body 15 by two air thrust bearings $P_1$ and $P_2$ formed respectively on either side of a portion 11*a* of the rotor 11 that is substantially in the form of a radial collar. Other shapes for the rotor 11 and other three-dimensional arrangements for the air bearing(s) used for keeping the rotor spaced apart from the body 15 could naturally be envisaged.

The air thrust bearing $P_1$ is fed from an annular distribution chamber 6 by a plurality of ducts 61 distributed regularly around the axis X-X', thus enabling sufficient air pressure to be established in the bearing $P_1$, thereby limiting any risk of accidental contact between the facing surfaces 1*ib* of the portion 11*a* and 15*b* of the body 15, having the thrust bearing $P_1$ defined between them.

The thickness of the air film of the thrust bearing $P_1$ is written $E_1$. The width of the airgap E is written $l_E$. The width $l_E$ of the airgap E allows relative axial movement to take place between the stator and rotor portions of the turbine 11. The value of $l_E$ is greater than that of $e_1$. Thus, the airgap E does not interfere with variations in the thickness of the air film in the thrust bearing $P_1$. In practice, the value of $l_E$ can be equal to several times, in particular eight to ten times, the value of $e_1$. In the figures, for clarity in the drawing, the thickness of $e_1$ is exaggerated relative to the width $l_E$.

The rotor 11 is fitted with means (not shown) enabling its rotation about the axis X-X' to be controlled, in particular with fins or the equivalent.

Given that the force $F_3$ is transmitted to the rotor 11 as stated above, the fact that the bowl 3 is put into place on the rotor 11 causes the portion 11*a* to tend to be pushed back towards the surface 15*b*, thereby tending to reduce the thickness $e_1$ of the film of air in the thrust bearing $P_1$.

This trend to reducing the thickness $e_1$ is balanced by the pressure $P_r$ of the air in the thrust bearing $P_1$, with this pressure depending on the flow rate of the air fed from the compressed air source $S_2$ connected to the chamber 6 and on the head losses in the injectors.

Thus, in normal operation of the sprayer P, the pressure $P_r$ balances the force $F_3$ in the thrust bearing $P_1$, and the thickness $e_1$ has a value that is substantially equal to a nominal value. Under such circumstances, the value of the pressure $P_r$ is substantially equal to a known nominal value $P_{ro}$.

A pressure takeoff 7 is formed in the body 15 and opens out into the surface 15*b*, in the bearing $P_1$.

This pressure takeoff is formed by a tapping point 71 of small diameter to avoid disturbing the operation of the bearing $P_1$, e.g. a diameter lying in the range 0.5 millimeters (mm) to 1 mm, and that opens out into the surface 15*b*, and by a female coupling 72 connected to a pipe 81 leading to a device 8 of any suitable type for measuring pressure, e.g. a strain gauge. The device 8 is thus capable of determining the value of the pressure $P_r$. This device 8 is connected to a comparator 9 in which the value of the pressure $P_r$ can be compared with one or more predetermined threshold values that depend on $P_{ro}$. Depending on the result of the comparison between pressure values, the comparator 9 generates an electrical signal E that can be addressed to a processor unit optionally incorporating an alarm device, such as a siren, or a device for stopping the installation I that can be activated as a function of the signal Σ.

In a variant of the invention that is not shown, the tapping point 71 may open out into the surface 15*b* between two ducts 61, thereby improving the reliability with which the pressure $P_2$ is measured since it is in the vicinity of the outlet from the ducts 61 that this pressure is at its greatest, and thus subject to the greatest variations.

In normal operation, the detected value of the pressure $P_r$ is substantially equal to $P_{ro}$, and this is verified in the comparator 9.

If the sprayer P is put into operation and if the thrust bearing $P_1$ is fed while the bowl 3 is not in place on the rotor 11, then the force $F_3$ is not applied to the interface between the elements 3 and 11, so it does not oppose the force due to the pressure in the bearing $P_1$. The thickness $e_1$ can then increase while the pressure fed to the bearing from the source $S_2$ remains constant. Thus, the value of the pressure $P_r$ is less than that observed in normal operation, and this can be detected via the pressure takeoff 7 and the devices 8 and 9, using the value of the signal Σ.

In a variant, the detected value of the pressure $P_r$ is compared in the comparator 9 with a minimum acceptable threshold value and a maximum acceptable threshold value.

In the same manner, if the bowl 3 is incorrectly mounted on the rotor 11, a force $F_3$ is generated having a magnitude that is out of compliance, and that can be detected by measuring the pressure $P_r$ in the bearing $P_1$.

Thus, using the pressure takeoff 7, the device 8, and the comparator 9 makes it possible to verify that the bowl is properly mounted whenever the sprayer is to operate.

An annular groove 11*c* is formed in the surface 116 substantially facing the outlet of the tapping point 71. Thus, in the event of accidental contact between the surfaces 11*b* and 15*b*, e.g. in the event of a sudden interruption of the air feed to the thrust bearing $P_1$, the risks of the tapping point 71 becoming obstructed by localized melting of the surface 15*b* are very limited, or even impossible, since the groove 11*c* avoids any direct contact between the surfaces 11*b* and 15*b* at the tapping point 71.

In a variant, the outlet of the tapping point 71 can be provided in the bottom of a setback formed in the surface 15*b*, thereby likewise avoiding any direct contact between the surfaces 1*ib* and 15*b* at the tapping point 71.

In another variant, the above-mentioned groove and setback can be used together.

In a first approach, it is possible to perform a comparison step in the comparator 9 each time the sprayer P is started. In another approach, such a comparison can be performed periodically, e.g. once every 15 seconds, or continuously throughout the operation of the sprayer, i.e. "dynamically". Comparison can also be performed "statically", i.e. when the thrust bearing $P_1$ is fed, but without the rotor 11 turning, since the force $F_3$ must be present independently of any rotation of the rotor. The three above-mentioned approaches can be used cumulatively.

According to another aspect of the invention (not shown), the pressure can be detected in the bearing $P_2$ since this pressure also varies depending on the mounting conditions of the bowl 3 on the rotor 11.

In any event, the threshold values used in the comparator 9 are the result of calibrating the pressure measured under normal operating conditions of the sprayer P.

The invention is shown above with a force $F_3$ that induces coupling in rotation between the bowl and the rotor by adhesion. Nevertheless, it is also applicable to circumstances in which the bowl is screwed on the rotor, providing a magnetic force or a force of some other kind, e.g. due to air flow, is exerted between the bowl and a non-rotary portion of the turbine. The force is not necessarily magnetic, since it can be the result of air-flow forces acting on the bowl as the result of its rotation. Rotation of the bowl can create a reduction in pressure located in its immediate vicinity by a suction effect, with this sometimes being referred to as the "fan" effect.

Depending on the location of this pressure reduction, the force induced on the bowl may tend to separate the bowl from the rotor (force directed to the right in FIG. 1) or to press it thereagainst (force directed to the left in FIG. 1). Thus, the pressure that influences the thickness of the film of air in the thrust bearing is not necessarily directed towards the rear end of the turbine.

In addition, a magnetic force may be directed in the direction opposite to that of the force $F_3$ shown in the figures. When the bowl 3 is screwed on the rotor 11, the 20 magnetic coupling means may comprise magnets mounted both on the support 5 and on the bowl 3 taking the place of the ring 4, and having polarities such that they oppose each other. Under such circumstances, the magnetic force induced tends to enlarge the air film in the thrust bearing $P_1$ and to shrink the air film in the bearing $P_2$.

With a magnetic force, this force acts both when the bowl is rotating and when it is stationary, providing the bowl is properly mounted on the rotor. With a force that is due to air-flow forces, this force can act only when the bowl is rotating.

The comparator 9 is optional, particularly in a manual installation, insofar as the operator can read the measured value of $P_r$ directly from a display of the device 8, and knowing the nominal value Pro, can act accordingly.

The invention claimed is:

1. A rotary sprayer for spraying coating material, the sprayer comprising an atomizer bowl and a member suitable for driving said bowl in rotation about an axis, said member being held at a distance from a non-rotary portion of the sprayer by means of at least one air thrust bearing, the sprayer being characterized in that it includes means for monitoring the presence and/or proper mounting of said bowl on said drive member, said means comprising magnetic coupling means mounted on a non-rotary portion of said sprayer and in magnetic contact with the surface of said bowl enabling a magnetic force, acting at least partially in parallel with said axis to be exerted on said bowl tending to oppose and vary the thickness of the air film of said air thrust bearing; and second means for determining the air pressure in said thrust bearing, said second means being connected to means for comparing the determined value of the air pressure with at least one reference value.

2. A sprayer according to claim 1, characterized in that said force ($F_3$) is suitable for inducing the rotary coupling between said bowl and said member.

3. A sprayer according to claim 1, characterized in that the value of the width of an airgap defined by said magnetic coupling means is greater than the value of the thickness of the air film of said thrust bearing.

4. A sprayer according to claim 1, characterized in that said second means comprise at least one pressure takeoff formed in said thrust bearing and a device for measuring pressure connected to said pressure takeoff.

5. A sprayer according to claim 4, characterized in that at least one of the surfaces between which said thrust bearing is defined is provided with a setback portion in relief formed around or facing the outlet of said pressure takeoff in said thrust bearing.

6. An installation for spraying coating material, the installation being characterized in that it includes at least one sprayer according to claim 1.

7. A method of verifying the operating state of a rotary sprayer for spraying coating material, the sprayer including an atomizer bowl and a member for driving said bowl in rotation about an axis, said member being subjected to a force that is axial at least in part and being held spaced apart from a non-rotary portion of the sprayer against said force by means of an air thrust bearing, wherein at least one magnet is mounted on said non-rotary portion of said sprayer abutting the surface of said bowl enabling a magnetic force tending to oppose the air film in said air thrust bearing force, said method comprising a step consisting in:

determining the air pressure in said thrust bearing while it is normally fed, the method being characterized in that it further comprises a step consisting in:

monitoring the presence and/or proper positioning of said bowl by; comparing the determined value of said pressure with at least one reference value.

8. A method according to claim 7, characterized in that said steps are implemented each time said sprayer is started.

9. A method according to claim 7, characterized in that said steps are implemented periodically or continuously while said bowl is driven in rotation during operation of said sprayer.

10. A method according to claim 7, characterized in that said steps are implemented while the bowl is stationary, the thrust bearing being fed with air under pressure.

* * * * *